United States Patent Office 3,086,031
Patented Apr. 16, 1963

1

3,086,031
SUBSTITUTED STEROID ETHERS OF THE PREGNANE SERIES
Seymour Bernstein and Milton D. Heller, New City, N.Y., assignors to American Cyanamid Company, New York, N.Y., a corporation of Maine
No Drawing. Filed Oct. 28, 1960, Ser. No. 65,586
5 Claims. (Cl. 260—397.45)

This invention relates to $C_6$-ethers of steroids of the pregnane series. More particularly, it relates to $C_6$-lower alkoxy and -lower aralkoxy pregnenes and pregnadienes.

The novel compounds of the present invention can be illustrated by the following general formula:

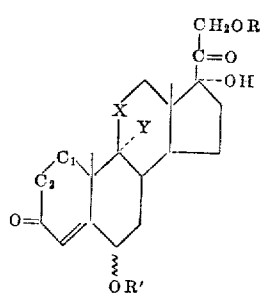

in which $$\begin{array}{c} C_1 \\ | \\ C_2 \end{array}$$

is a divalent radical of the group consisting of

—$CH_2$—$CH_2$— and

—CH=CH— radicals, X is a divalent radical of the group consisting of $$\begin{array}{c} H(\alpha) \\ \diagdown \\ C \\ \diagup \\ HO\,(\beta) \end{array}$$

and O=C< radicals, R is a member of the group consisting of hydrogen and lower alkanoyl radicals, R' is a member of the group consisting of lower alkyl and lower aralkyl radicals and Y is a member of the group consisting of hydrogen and halogen atoms.

The compounds of the present invention are, in general, crystalline solids which are relatively insoluble in water. The compounds are somewhat more soluble in, and crystallizable from solvents such as, for example, methanol, ethanol, ethyl acetate, acetone, dimethylformamide, dioxane, ether, benzene, toluene, chloroform and the like or mixtures thereof.

The compounds of the present invention fall into four general categories.

(A) The 6β-lower aralkoxy pregnenes I, II, and III.
(B) The 6β-lower alkoxy pregnenes IV thru XIII. (C) The 6α-lower alkoxy pregnenes XIV thru XXI. (D) The 6α-lower alkoxy-1,4-pregnadienes XX thru XXVII.

The Roman numerals above refer to the compounds illustrated in the following flowsheet.

2
FLOWSHEET (IV) R=H
(V) R=Ac (VI) R=H
(VII) R=Ac (VIII) R=H
(IX) R=Ac (XII) R=H
(XIII) R=Ac

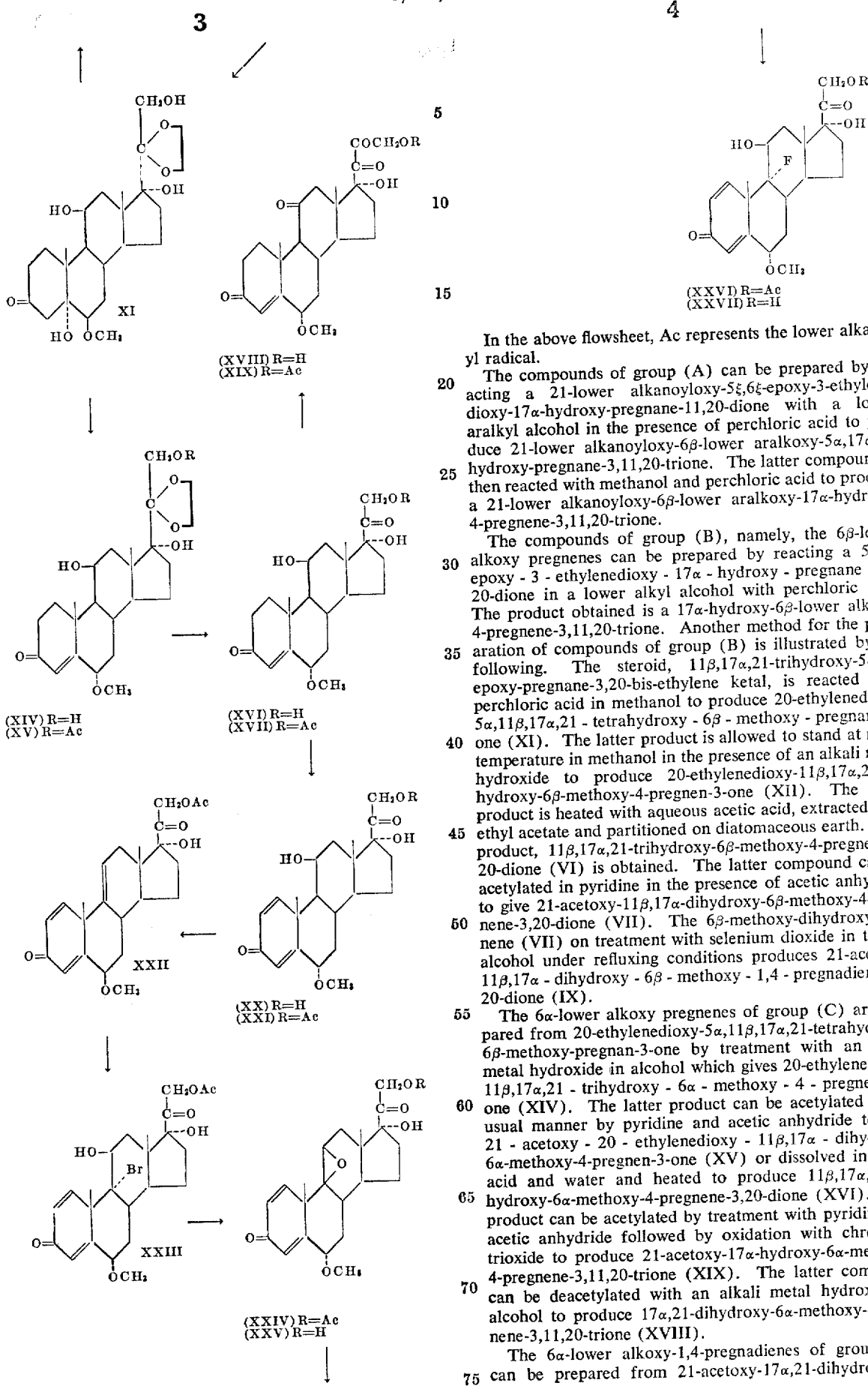

In the above flowsheet, Ac represents the lower alkanoyl radical.

The compounds of group (A) can be prepared by reacting a 21-lower alkanoyloxy-5ξ,6ξ-epoxy-3-ethylenedioxy-17α-hydroxy-pregnane-11,20-dione with a lower aralkyl alcohol in the presence of perchloric acid to produce 21-lower alkanoyloxy-6β-lower aralkoxy-5α,17α-dihydroxy-pregnane-3,11,20-trione. The latter compound is then reacted with methanol and perchloric acid to produce a 21-lower alkanoyloxy-6β-lower aralkoxy-17α-hydroxy-4-pregnene-3,11,20-trione.

The compounds of group (B), namely, the 6β-lower alkoxy pregnenes can be prepared by reacting a 5ξ,6ξ-epoxy - 3 - ethylenedioxy - 17α - hydroxy - pregnane - 11,20-dione in a lower alkyl alcohol with perchloric acid. The product obtained is a 17α-hydroxy-6β-lower alkoxy-4-pregnene-3,11,20-trione. Another method for the preparation of compounds of group (B) is illustrated by the following. The steroid, 11β,17α,21-trihydroxy-5α,6α-epoxy-pregnane-3,20-bis-ethylene ketal, is reacted with perchloric acid in methanol to produce 20-ethylenedioxy-5α,11β,17α,21 - tetrahydroxy - 6β - methoxy - pregnan - 3 - one (XI). The latter product is allowed to stand at room temperature in methanol in the presence of an alkali metal hydroxide to produce 20-ethylenedioxy-11β,17α,21-trihydroxy-6β-methoxy-4-pregnen-3-one (XII). The latter product is heated with aqueous acetic acid, extracted with ethyl acetate and partitioned on diatomaceous earth. The product, 11β,17α,21-trihydroxy-6β-methoxy-4-pregnene-3,20-dione (VI) is obtained. The latter compound can be acetylated in pyridine in the presence of acetic anhydride to give 21-acetoxy-11β,17α-dihydroxy-6β-methoxy-4-pregnene-3,20-dione (VII). The 6β-methoxy-dihydroxypregnene (VII) on treatment with selenium dioxide in t-butyl alcohol under refluxing conditions produces 21-acetoxy-11β,17α - dihydroxy - 6β - methoxy - 1,4 - pregnadiene - 3,20-dione (IX).

The 6α-lower alkoxy pregnenes of group (C) are prepared from 20-ethylenedioxy-5α,11β,17α,21-tetrahydroxy-6β-methoxy-pregnan-3-one by treatment with an alkali metal hydroxide in alcohol which gives 20-ethylenedioxy-11β,17α,21 - trihydroxy - 6α - methoxy - 4 - pregnen - 3 - one (XIV). The latter product can be acetylated in the usual manner by pyridine and acetic anhydride to give 21 - acetoxy - 20 - ethylenedioxy - 11β,17α - dihydroxy-6α-methoxy-4-pregnen-3-one (XV) or dissolved in acetic acid and water and heated to produce 11β,17α,21-trihydroxy-6α-methoxy-4-pregnene-3,20-dione (XVI). This product can be acetylated by treatment with pyridine and acetic anhydride followed by oxidation with chromium trioxide to produce 21-acetoxy-17α-hydroxy-6α-methoxy-4-pregnene-3,11,20-trione (XIX). The latter compound can be deacetylated with an alkali metal hydroxide in alcohol to produce 17α,21-dihydroxy-6α-methoxy-4-pregnene-3,11,20-trione (XVIII).

The 6α-lower alkoxy-1,4-pregnadienes of group (D) can be prepared from 21-acetoxy-17α,21-dihydroxy-6α- methoxy-4-pregnene-3,20-dione by dehydrogenation with selenium dioxide in t-butyl alcohol to give 21-acetoxy-11β,17α - dihydroxy - 6α - methoxy - 1,4 - pregnadiene-3,20-dione (XXI). This compound, when treated with thionyl chloride in pyridine, gives 21-acetoxy-17α-hydroxy - 6α - methoxy - 1,4,9(11) - pregnatriene - 3,20-dione (XXII). The latter compound, when reacted with N-bromoacetamide in the presence of perchloric acid, gives 21-acetoxy-9α-bromo-11β,17α - dihydroxy - 6α - methoxy-1,4-pregnadiene-3,20-dione (XXIII). The latter, when reacted with potassium acetate in alcohol under refluxing conditions, produces 21-acetoxy-9β,11β-epoxy-17α - hydroxy - 6α - methoxy - 1,4 - pregnadiene - 3,20-dione (XXIV). This compound reacted with hydrogen fluoride in the presence of methylene chloride and tetrahydrofuran produces 21-acetoxy-9α-fluoro-11β,17α-dihydroxy - 6α - methoxy-1,4-pregnadiene-3,20-dione (XXVI). The latter compound, when reacted with potassium carbonate in methanol, gives 9α-fluoro-11β,17α,21-trihydroxy - 6α-methoxy-1,4-pregnadiene-3,20-dione (XXVII).

The compounds of the present invention are active glucocorticoids. They are, therefore, useful as anti-inflammatory agents, particularly compounds such as 9α-fluoro - 11β,17α,21 - trihydroxy - 6α - methoxy - 1,4 - pregnadiene-3,20-dione. The use of anti-inflammatory agents in the treatment of arthritis, rheumatism and similar conditions is well known.

The compounds of the present invention can be used in pharmaceutical forms such as tablets, capsules, pills, powders and the like. It is understood that these pharmaceutical forms can have present, in addition to the therapeutically active agent excipients, diluents and so forth necessary in the preparation of the tablets, capsules, pills and so forth.

The following specific examples illustrate in detail the preparation of the C$_6$-ethers of steroids of the pregnane series.

EXAMPLE 1

*Preparation of 21-Acetoxy-17α-Hydroxy-6β-Methoxy-4-Pregnene-3,11,20-Trione (V)*

A. To a stirred suspension of 1 gram of 21-acetoxy-5ξ,6ξ - epoxy - 3 - ethylenedioxy - 17α - hydroxy - pregnane-11,20-dione (I) [Sondheimer et al., J. Am. Chem. Soc., 76, 5020; (1954)] in 50 ml. of methanol is added 0.4 ml. of 72% perchloric acid. After the suspension is stirred 22 hours at room temperature, a clear solution results. Solid sodium bicarbonate is added, the mixture filtered and the solvent evaporated under reduced pressure. The resultant semi-solid (1.73 g.) is acetylated with 5 ml. of pyridine and 2 ml. of acetic anhydride at room temperature for 16 hours and after pouring this solution into water and extracting with ethyl acetate, evaporation of the solvent gives 0.90 g. of a glass. This is chromatographed on silica gel. The ether-acetone (4:1) eluant yields 0.13 g. of solid, 21-acetoxy-17α-hydroxy-6β-methoxy-4-pregnene-3,11,20-trione (V) from acetone-petroleum ether, melting point 181–183° C. The analytically pure sample from acetone-water has a melting point of 186.5–188° C.

B. In an identical run to that above 0.18 g. of (V) melting point 186–187° C. is recovered from the ether-acetone (9:1) eluants from a silica gel column.

C. In an identical run to that above when the acetylating solution is poured into water a solid forms which is collected and crystallized from dilute acetone to give 0.345 g. of (V) melting point 180–186° C.

D. A suspension of 6.545 g. of (V) in 250 ml. of methanol is stirred with 22 ml. of 72% perchloric acid for 18 hours. Working up this reaction gives only glass (3.26 g.) after acetylation. This is put on a diatomaceous earth column as a slurry with the stationary (water) phase of a petroleum ether (90–100° C.), ethyl acetate, methanol, water (3:2:3:2) system. Development of the column with the mobile phase gives 1.57 g. of (V) collected from the third and part of the fourth hold-back volume, melting point 181–183° C.

E. A solution of 0.355 g. of crude 21-acetoxy-11β,17α-dihydroxy-6β-methoxy-4-pregnene-3,20-dione (VII) (the product of Example 6, below) in 6 ml. of pyridine is added to a suspension formed by adding 300 mg. of chromium trioxide to 3 ml. of pyridine. After standing at room temperature for 18 hours, the mixture is poured into water and filtered. The residue is boiled in ethyl acetate and filtered. The original filtrate is extracted with ethyl acetate and the combined ethyl acetate solutions are dried and the solvent removed under reduced pressure. Crystallization from dilute acetone gives 65 mg. of (V), melting point 180–182° C.

EXAMPLE 2

*Preparation of 17α,21-Dihydroxy-6β-Methoxy-4-Pregnene-3,11,20-Trione (IV)*

To a solution of 155 mg. of 6β-methoxy-cortisone acetate (V), (the product of Example 1) in methanol placed under a nitrogen atmosphere and held at 0° is added 30 mg. of potassium hydroxide. After standing for one-half hour at room temperature, the reaction mixture is neutralized with acetic acid and the solvent is evaporated. Crystallization from dilute methanol yields 65 mg. of 17α,21 - dihydroxy-6β-methoxy-4-pregnene-3,11,20-trione (IV), melting point 233–235° C. The analytical sample from methanol-water had a melting point 244.5–245° C.

EXAMPLE 3

*Preparation of 21-Acetoxy-6β-Benzyloxy-5α,17α-Dihydroxy-Pregnane-3,11,20-Trione (II)*

A slurry of 1.6 g. of 21-acetoxy-5ξ,6ξ-epoxy-3-ethylenedioxy-17α-hydroxy-pregnane-11,20-dione (I) in 50 ml. of benzyl alcohol and 0.5 ml. of 72% perchloric acid is stirred for 17 hours. The resultant clear solution is neutralized with sodium bicarbonate, filtered and the solvent removed by evaporation. Acetic anhydride (2 ml.) and pyridine (5 ml.) is added to the residue and the resultant solution allowed to stand at room temperature overnight. The solution is then poured into water and the mixture is extracted with ethyl acetate. The extract is dried, treated with activated carbon and the solvents removed by evaporations to give a glass. Crystallization from acetone-petroleum ether gives 0.47 g. of 21-acetoxy-6β-benzyloxy-5α,17α-dihydroxy-pregnane-3,11,20-trione (II), melting point 243–245° C. Several more crystallizations gave a melting point of 251.5–253° C.

In an experiment run similar to the above on 5.27 g. of (I) which is columned on silica gel, the ether elutions gives 0.605 g. of (II), melting point 240–243° C.

EXAMPLE 4

*Preparation of 21-Acetoxy-6β-Benzyloxy-17α-Hydroxy-4-Pregnene-3,11,20-Trione (III)*

A solution of 1.44 g. of crude 5α-hydroxy-6β-benzyloxy-21-acetate, (II) (the product of Example 3), in 50 ml. of methanol and 0.6 ml. of 72% perchloric acid is stirred for 17 hours at room temperature. The solution is filtered, poured into water and the mixture is extracted with ethyl acetate. The extract is evaporated and the residue is treated with acetic anhydride (2 ml.) and pyridine (5 ml.) overnight and the solution is poured into water. Extraction of this mixture with ethyl acetate gives a glass (1.0 g.) after removal of the solvent. This glass is partitioned on a diatomaceous earth column with the solvent system petroleum ether (90–100°); ethyl acetate:methanol:water (3:2:3:2). A cut taken from the middle of the first hold-back volume gives 0.485 g. of amorphous solid 21 - acetoxy-6β-benzyloxy-17α-hydroxy-4-pregnene-3,11,20-trione (III), melting point 110–120° C.

EXAMPLE 5

*Preparation of 11β,17α,21-Trihydroxy - 6β - Methoxy-4-Pregnene-3,20-Dione (VI) [and also 11β,17α,21-Trihydroxy-6α-Methoxy-4-Pregnene-3,20-Dione] (XVI)*

A crude sample (4.4 g., mixture of epimers at $C_6$) of 20-ethylenedioxy - 11β,17α,21 - trihydroxy-6-methoxy-4-pregnen-3-one (the β epimer being (XII), the product of Example 11) is heated in a mixture of 45 ml. of acetic acid and 30 ml. of water on a steam bath for 40 minutes after solution occurred and then is poured into water. The resultant solution is extracted with ethyl acetate and the extract washed with dilute sodium bicarbonate followed by saline solution. After drying, the solvent is evaporated and partitioned on a diatomaceous earth column using the solvent system cyclohexane:dioxane:water (5:5:1). The fractions collected from the latter half of the third hold-back volume and first half of the fourth hold-back volume are combined and evaporated to give after crystallization from acetone-petroleum ether 1.7 g. of 11β,17α,21-trihydroxy - 6β - methoxy-4-pregnene-3,20-dione (VI), melting point 221–227.5° C. Further crystallization from the same solvent pair gives a melting point of 238–240° C.

Evaporation of the fifth hold-back volume of the above described column gives after crystallization from ethyl acetate 0.345 g. of 6α-methoxyhydrocortisone (XVI, the product of Example 11), melting point 215–217° C. which upon further crystallization gives a melting point of 233–235° C.

EXAMPLE 6

*Preparation of 21-Acetoxy-11β,17α-Dihydroxy-6β-Methoxy-4-Pregnene-3,20-Dione (VII)*

A crude sample (0.75 g.) of 6β-methoxy-hydrocortisone (VI, the product of Example 5) is acetylated in the usual manner in 5 ml. of pyridine with 2 ml. of acetic anhydride. The resultant glass is submitted to partition chromatography on diatomaceous earth with the system heptane:ethyl acetate:methanol:water (3:2:3:2). The fraction consisting of the third hold-back volume and the first part of the fourth hold-back volume is evaporated and crystallized from acetone-petroleum ether to give 0.325 g. of 21-acetoxy-11β,17α-dihydroxy-6β-methoxy-4-pregnene-3,20-dione (VII), melting point 188–189° C. Recrystallization from the same solvent pair gives a melting point of 190–191°C.

EXAMPLE 7

*Preparation of 21-Acetoxy-11β,17α-Dihydroxy-6β-Methoxy-1,4-Pregnadiene-3,20-Dione (IX)*

A mixture of 1.605 g. of 6β-methoxy-hydrocortisone acetate (VII, the product of Example 6) and 1.74 g. of selenium dioxide in 160 ml. of t-butyl alcohol and 1.9 ml. of water is refluxed under nitrogen for 28 hours. An additional 1.75 g. of selenium dioxide is then added and the refluxing is continued under nitrogen an additional 25 hours when paper chromatography indicates the reaction has gone substantially to completion. The mixture is worked up as in the preparation of (XXI), the product of Example 15. The fifth hold-back volume yields 0.12 g. of starting material while the sixth hold-back volume gives 0.3 g. of 21-acetoxy-11β,17α-dihydroxy-6β-methoxy-1,4-pregnadiene-3,20-dione (IX), melting point 200–210°C. An additional 45 mg., melting point 204.5–208° C. is accumulated from the mother liquor. Crystallization of the combined solid gives 205 mg. of 6β-methoxy-prednisolone acetate (IX), melting point 214–215°C.

EXAMPLE 8

*Preparation of 11β,17α,21-Trihydroxy-6β-Methoxy-1,4-Pregnadiene-3,20-Dione (VIII)*

A crude sample (200 mg.) of 6β-methoxy-prednisolone acetate (IX, the product of Example 7) is dissolved in 20 ml. of methanol and 0.33 ml. of 10% potassium carbonate solution under nitrogen at room temperature. After standing 20 minutes, the solution is neutralized with acetic acid and evaporated. Crystallization of the residue from acetone-petroleum ether furnishes 50 mg. of 11β,17α,21 - trihydroxy - 6β-methoxy-1,4-pregnadiene-3,20-dione (VIII), melting point 221–225°C. The analytically pure sample has a melting point of 223–225°C.

EXAMPLE 9

*Preparation of 21-Acetoxy-20-Ethylenedioxy-11β,17α-Dihydroxy-6β-Methoxy-4-Pregnen-3-One (XIII)*

A mixture (4.07 g.) of 6β-methoxy-hydrocortisone (VI, the product of Example 5) and its 20-ethylene ketal (XII, the product of Example 11) is acetylated in 15 ml. of pyridine and 5 ml. of acetic anhydride in the usual manner. The resultant solid is crystallized from acetone to give 0.20 g. of (XIX), melting point 260–262° C. Recrystallization from acetone gives 21-acetoxy-20-ethylenedioxy-11β,17α-dihydroxy - 6α - methoxy-4-pregnen-3-one, melting at 271.5–272.5°C.

The mother liquors of the above crystallization is concentrated and petroleum ether added to give 1.4 g. of 6β-methoxy-hydrocortisone acetate (VII, the product of Example 8), melting point 181.5–186°C.

EXAMPLE 10

*Preparation of 20-Ethylenedioxy-5α,11β,17α,21-Tetrahydroxy-6β-Methoxy-Pregnen-3-One (XI)*

To a stirred suspension of 10 g. of the 5α,6α-epoxide (X) [Littell and Bernstein, J. Am. Chem. Soc., 78, 984 (1956)] in 500 ml. of methanol is added 10 ml. of 10% perchloric acid and the stirring continued for 35 minutes at room temperature whereupon most of the solid goes into solution. The resultant mixture is filtered to give 1.27 g. of starting material (X). The filtrate is neutralized with a saturated sodium bicarbonate and almost all the solvent is then removed at room temperature. Filtration yields 5.245 g. of 20-ethylenedioxy-5α,11β,17α,21-tetrahydroxy-6β-methoxy-pregnan-3-one (XI) melting point 257.5–260° C. Further concentration of the mother liquor gives a second crop (1.625 g.) of the tetrol (XI), melting point 259–262°C. Several crystallizations of this material from acetone gives a constant melting point of 258.5–260°C.

EXAMPLE 11

*Preparation of 20-Ethylenedioxy-11β,17α,21-Trihydroxy-6β-Methoxy-4-Pregnen-3-One (XII)*

To a solution of 0.28 g. of the tetrol (XI, the product of Example 10) in 26 ml. of methanol is added 26 ml. of 0.1 N sodium hydroxide, and the mixture is allowed to stand at room temperature for 18 hours. The solution is then neutralized with acetic acid and the solvent evaporated at room temperature. The residue is washed with water, dissolved in acetone and dried, and finally 0.105 g. of 20-ethylenedioxy-11β,17α,21-trihydroxy-6β-methoxy-4-pregnen-3-one (XII) is obtained by crystallization from acetone-petroleum ether. Further crystallization from the same solvent pair gives melting point 225.5–226.5°C.

EXAMPLE 12

*Preparation of 20-Ethylenedioxy-11β,17α,21-Trihydroxy-6α-Methoxy-4-Pregnen-3-One (XIV)*

A solution of 1 g. of the tetrol (XI, the product of Example 10) in 100 ml. of methanol is treated with 100 ml. of 0.3 N sodium hydroxide for 18 hours, and then is worked up exactly as described for the isolation of (VI) to give after crystallization from acetone 0.69 g. of material, melting point 205–225° C. Two crystallizations from acetone yields the pure 6α-methoxy compound (XIV), melting point 238–239.5° C.

The above reaction can also be carried out in approximately the same yield by refluxing the steroid in a 2.5% sodium hydroxide methanol solution for 40 minutes.

EXAMPLE 13

*Preparation of 21-Acetoxy-20-Ethylenedioxy-11β,17α-Dihydroxy-6α-Methoxy-4-Pregnen-3-One (XV)*

Acetylation of 0.87 g. of crude (XIV, the product of Example 12) in 5 ml. of pyridine and 1 ml. of acetic anhydride gives after one crystallization from acetone 0.24 g. of 21-acetoxy-20-ethylenedioxy - 11β,17α - dihydroxy-6α-methoxy-4-pregnen-3-one (XV), melting point 260–263.5° C. Recrystallization from acetone gives a melting point of 265.5–266° C.

EXAMPLE 14

*Preparation of 11β,17α,21-Trihydroxy-6α-Methoxy-4-Pregnene-3,20-Dione (XVI)*

A mixture of 1.12 g. of the triol (XIV, the product of Example 12) is dissolved in 15 ml. of acetic acid by heating on the steam bath, 5 ml. of water is added and the heating is continued for 1½ hours. The reaction mixture is then worked up exactly as in the preparation of (VI) except that chromatography is not required. Concentration of the final ethyl acetate extract gives 0.51 g. of 11β,17α,21-trihydroxy - 6α - methoxy - 4 - pregnene-3,20-dione (XVI), melting point 228–231° C. The analytically pure sample from ethyl acetate has a melting point of 234–238° C.

EXAMPLE 15

*Preparation of 21-Acetoxy-11β,17α-Dihydroxy-6α-Methoxy-4-Pregnene-3,20-Dione (XVII)*

Acetylation of 0.73 g. of crude 6α-methoxy-hydrocortisone (XVI, the product of Example 14) with 3 ml. of pyridine and 1 ml. of acetic anhydride in the usual manner gives 0.5 g. of crude residue, melting point 176–178.5° C. after pouring into water. Crystallization from acetone-petroleum ether gives a melting point of 183–184° C.

EXAMPLE 16

*Preparation of 21 - Acetoxy-17α-Hydroxy-6α-Methoxy-4-Pregnene-3,11,20-Trione (6α-Methoxy Cortisone Acetate) (XIX)*

A solution of 1.26 g. of 6α-methoxy-hydrocortisone acetate (XVII, the product of Example 15) in 12 ml. of pyridine is added to a suspension of 1.2 g. of chromium trioxide in 12 ml. of pyridine, and the resultant mixture is allowed to stand at room temperature 17 hours. The mixture is worked up exactly as mentioned in the preparation of (I) (the product of Example 1) by the procedure labelled (E). The resultant colored residue (0.64 g., melting point 225–227° C.) is dissolved in methylene chloride, slurried with a magnesium silicate filter aid and filtered. The filtrate is evaporated to give after recrystallization from acetone-petroleum ether 0.38 g. of 6α-methoxy-cortisone acetate (XIX), melting point 229–231° C.

Slurrying the magnesium silicate filter aid residue with ether then with ether-acetone (14:1) gives an additional 0.18 g. of (XIX), melting point 225–227° C.

EXAMPLE 17

*Preparation of 17α,21-Dihydroxy-6α-Methoxy-4-Pregnene-3,11,20-Trione (XVIII)*

To a solution of 165 mg. of the 21-acetate (XIX, the product of Example 16) in 20 ml. of methanol placed under a nitrogen atmosphere is added 2.5 ml. of a solution made up of 150 mg. of potassium hydroxide in 15 ml. of methanol. The solution is allowed to stand at room temperature under nitrogen for one-half hour, then neutralized with acetic acid. Evaporation of the solvent gives a residue which is crystallized from acetone-petroleum ether to give 70 mg. of 17α,21-dihydroxy-6α-methoxy-4-pregnene-3,11,20-trione (XVIII), melting point 201–202° C.

EXAMPLE 18

*Preparation of 21-Acetoxy-11β,17α-Dihydroxy-6α-Methoxy-1,4-Pregnadiene-3,20-Dione (XXI)*

A mixture of 1.27 g. of 6α-methoxy-hydrocortisone acetate (XVII, the product of Example 15) and 1.38 g. of selenium dioxide in 127 ml. of t-butyl alcohol and 1.5 ml. of water is refluxed under nitrogen for 26 hours when paper strip chromatography indicates the reaction has gone nearly to completion. The resultant mixture is filtered and evaporated. The residue is dissolved in chloroform, filtered once again and the solution is washed with sodium bicarbonate solution and finally with salt solution. After drying and removing the chloroform, the residue is dissolved in 50 ml. of methanol and stirred 2 hours with 1 teaspoonful of acetic acid deactivated Raney nickel catalyst, filtered and the methanol is removed to give 0.97 g. of crude solid. This is submitted to partition chromatography on diatomaceous earth using the system heptane (3 parts), ethyl acetate (2 parts), methanol (2 parts) and water (2 parts). Evaporation of hold-back volumes seven and eight gives 65 mg. of starting material. Evaporation of hold-back volumes nine and ten gives 0.3 g. of the Δ$^{1,4}$-pregnadiene (XXI), melting point 219.5–222° C. Crystallization of this sample from acetone-petroleum ether gives a melting point of 221.5–224° C.

EXAMPLE 19

*Preparation of 11β,17α,21-Trihydroxy-6α-Methoxy-1,4-Pregnadiene-3,20-Dione (XX)*

A solution of 0.61 g. of (XXI, the product of Example 18) in 60 ml. of methanol and 1.015 ml. of 10% potassium carbonate solution is allowed to stand under nitrogen 20 minutes. After neutralization with acetic acid, the solution is concentrated at room temperature and water added. Crude solid (0.375 g.) is collected and crystallized from acetone-petroleum ether to give pure (XX), melting point 249–250.5° C.

EXAMPLE 20

*Preparation of 21-Acetoxy-17α-Hydroxy-6α-Methoxy-1,4,9(11)-Pregnatriene-3,20-Dione (XXII)*

To a solution of 0.375 g. of 6α-methoxy-prednisolone acetate (XXI) in 5 ml. of pyridine at 5° C. is added 0.5 ml. of thionyl chloride. After standing at this temperature for 10 minutes, the solution is poured into ice water, extracted with ethyl acetate and dried. Removal of the solvent gives 0.145 g. of crude triene (XXII), melting point 206–208° C. Crystallization from methanol gives the analytically pure sample, melting point 226–228.5° C.

EXAMPLE 21

*Preparation of 21 - Acetoxy - 9α - Bromo - 11β,17α-Dihydroxy - 6α - Methoxy - 1,4 - Pregnadiene - 3,20-Dione (XXIII)*

To a solution of the pregnatriene (XXII) (0.2 g.) in 8 ml. of dioxane and 1.6 ml. of water kept at 20° C. is added 0.8 ml. of 10% perchloric acid and 0.133 g. of N-bromoacetamide. After the solution remained at this temperature 15 minutes, an excess of saturated sodium sulfite is added, followed by water. The mixture is extracted with chloroform, which is washed with saline and dried. Evaporation of the solvent at 45–50° C. gives a solid which is recrystallized from acetone-petroleum ether (60–70°) to give 0.095 g., melting point 207° decomposition.

EXAMPLE 22

*Preparation of 21 - Acetoxy - 9β,11β - Epoxy - 17α-Hydroxy - 6α - Methoxy - 1,4 - Pregnadiene - 3,20-Dione (XXIV)*

The total crude solid of the bromohydrin (Example 21) (XXIII) obtained from a preparation starting from 0.5 g. of the pregnatriene (I) is dissolved in 100 ml. of absolute ethanol and 750 mg. of dry potassium acetate is added. The resultant solution is refluxed for eighteen hours and the solvent removed under reduced pressure. Water and ethyl acetate are added and the organic layer separated. After drying, the ethyl acetate is evaporated to give an oil which is crystallized from acetone-petroleum ether (boiling point 60–70°) to yield 0.342 g. of the desired product, melting point 222–228° C. Recrystallization from the same solvent pair gives the analytical sample, melting point 234–235° C.

EXAMPLE 23

*Preparation of 21 - Acetoxy - 9α - Fluoro - 11β,17α-Dihydroxy - 6α - Methoxy - 1,4 - Pregnadiene - 3,20-Dione (XXVI)*

The 9β,11β-epoxide (XXIV) (Example 22) (0.48 g.) is dissolved in 30 ml. of methylene chloride and 2.5 ml. of tetrahydrofuran. The solution is cooled to −60° C. and 2 ml. of hydrogen fluoride is added. The resultant solution is allowed to stand at −5° C. for 3½ hours, then poured slowly into a flask containing a saturated sodium bicarbonate solution and 100 ml. of methylene chloride. The methylene chloride layer is further washed with sodium bicarbonate solution, dried and evaporated. Crystallization from acetone-petroleum ether gives solid, melting point 218.5–227° C. Recrystallization from the same solvent pair gives pure desired compound, melting point 250–250.5° C.

EXAMPLE 24

*Preparation of 9β,11β-Epoxy-17α,21-Dihydroxy-6α-Methoxy-1,4-Pregnadiene-3,20-Dione (XXIV)*

Crude mother liquors (0.28 g.) from a preparation of the fluorohydrin (Example 23) is dissolved in 27.5 ml. of methanol and 0.467 ml. of 10% potassium carbonate is added under nitrogen. After standing for 20 minutes under nitrogen at room temperature, the solution is neutralized with acetic acid and the solvent is evaporated to give a glass. This glass is partitioned on a diatomaceous earth column with the solvent system heptane, ethyl acetate, methanol, water (60:40:12:8). Evaporation of the fourth hold-back volume gives a solid (0.095 g.) (XXV) which is crystallized from acetone-petroleum ether (boiling point 60–70°), melting point 204–205.5° C.

The methanol wash from the above described column is resubmitted to a partition column on diatomaceous earth with the system heptane, ethyl acetate, methanol, water (50:50:12:8). Evaporation of the third hold back volume gives 0.015 g. of solid, melting point 258–259° C. The infrared spectrum of this sample is identical to that of authentic product (XXVII), Example 25.

EXAMPLE 25

*Preparation of 9α-Fluoro-11β,17α,21-Trihydroxy-6α-Methoxy-1,4-Pregnadiene-3,20-Dione (XXVII)*

A solution of 0.26 g. of the fluorohydrin acetate (XXVI) (Example 23) in 25 ml. of methanol is covered with nitrogen and 0.45 ml. of 10% potassium carbonate is added. After standing at room temperature under nitrogen for twenty minutes, the solution is neutralized with acetic acid and the solvent evaporated. Crystallization from acetone-petroleum ether (60–70°) gives 0.12 g. of desired product, melting point 263–264° C.

We claim:
1. The 9α - fluoro - 11β,17α,21 - trihydroxy - 6α-lower alkoxy-1,4-pregnadiene-3,20-diones.
2. The compound 21-acetoxy-9α-bromo-11β,17α-dihydroxy-6α-methoxy-1,4-pregnadiene-3,20-dione.
3. The compound 9α-fluoro-11β,17α,21-trihydroxy-6α-methoxy-1,4-pregnadiene-3,20-dione.
4. The compound 21-acetoxy-11β,17α-dihydroxy-9α-fluoro-6α-methoxy-1,4-pregnadiene-3,20-dione.
5. A compound having the formula:

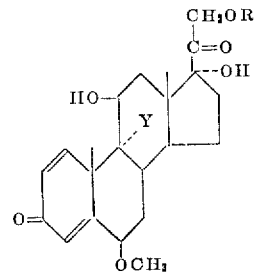

in which R is a member selected from the group consisting of hydrogen and lower alkanoyl radicals and Y is a member selected from the group consisting of bromo and fluoro atoms.

References Cited in the file of this patent

UNITED STATES PATENTS

| | | |
|---|---|---|
| 2,672,468 | Bruce et al. | Mar. 16, 1954 |
| 2,881,168 | Spero | Apr. 7, 1959 |
| 2,889,255 | Murray et al. | June 2, 1959 |
| 2,908,696 | Nussbaum et al. | Oct. 13, 1959 |
| 3,012,029 | Bible | Dec. 5, 1961 |

FOREIGN PATENTS

| | | |
|---|---|---|
| 1,000,814 | Germany | Jan. 17, 1957 |

OTHER REFERENCES

Schering A. G.: Derwent Belgian Report No. 55a, June 30, 1959.

Fishman: "Journal American Chem. Soc.," vol. 80 (1958), pages 1213–16.

UNITED STATES PATENT OFFICE
CERTIFICATE OF CORRECTION

Patent No. 3,086,031                        April 16, 1963

Seymour Bernstein et al.

It is hereby certified that error appears in the above numbered patent requiring correction and that the said Letters Patent should read as corrected below.

Column 12, lines 23 to 34, the formula should appear as shown below instead of as in the patent:

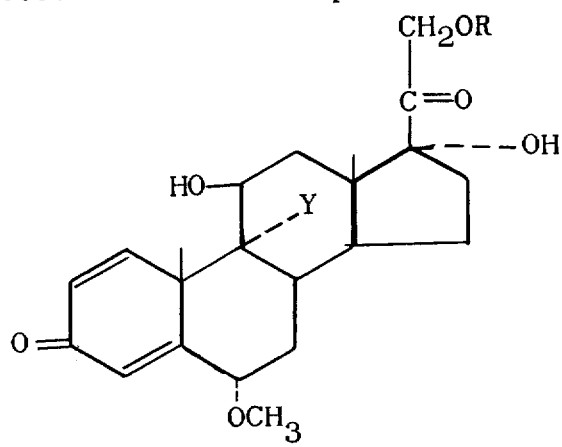

Signed and sealed this 19th day of November 1963.

(SEAL)
Attest:
ERNEST W. SWIDER
Attesting Officer

EDWIN L. REYNOLDS

Acting Commissioner of Patents